(12) United States Patent
Bradt

(10) Patent No.: US 6,261,488 B1
(45) Date of Patent: Jul. 17, 2001

(54) WELD LINE SUPPRESSION

(75) Inventor: Rexford H. Bradt, Warsaw, IN (US)

(73) Assignee: Materials Research Innovations Corporation, Warsaw, IN (US)

( * ) Notice: Subject to any disclaimer, the term of this patent is extended or adjusted under 35 U.S.C. 154(b) by 0 days.

(21) Appl. No.: 08/333,503

(22) Filed: Nov. 2, 1994

(51) Int. Cl.⁷ .......................... B29C 44/06; B29C 45/16; B29C 45/80
(52) U.S. Cl. .................. 264/45.3; 264/45.5; 264/250; 264/259; 264/328.1; 264/328.7; 264/328.18
(58) Field of Search .................. 264/45.3, 45.5, 264/328.7, 250, 328.18, 259, 45.2, 55, 328.1

(56) References Cited

U.S. PATENT DOCUMENTS

| | | | |
|---|---|---|---|
| 3,815,657 | * | 6/1974 | Malek et al. ...................... 264/45.3 |
| 4,031,176 | * | 6/1977 | Molbert ............................. 264/45.2 |
| 4,238,446 | * | 12/1980 | Tanaka ................................ 264/250 |
| 4,340,551 | * | 7/1982 | Wada et al. .................. 264/328.12 |
| 4,834,929 | * | 5/1989 | Dehoff et al. .................... 264/226 |
| 4,961,895 | * | 10/1990 | Klein ............................. 264/328.7 |
| 4,965,030 | * | 10/1990 | Thorn ................................ 264/46.6 |
| 5,429,786 | * | 7/1995 | Jogan et al. ........................ 264/259 |
| 5,811,175 | * | 9/1998 | Howie, Jr. ........................ 264/45.5 |
| 6,004,498 | * | 12/1999 | Fujii et al. ......................... 264/259 |
| 6,030,573 | * | 2/2000 | Matsumoto et al. ............. 264/259 |

\* cited by examiner

Primary Examiner—Allan R. Kuhns
(74) Attorney, Agent, or Firm—Taylor & Aust, P.C.

(57) ABSTRACT

A method for suppression of weld line weakening by virtually eliminating weld lines is disclosed. The process involves the near explosive injection of a metered amount of foamed thermoplastic molding material into an enclosing compartment formed by partly closing a compression type mold followed immediately by compression molding of the well mixed foamed material. The process finds particular utility in the manufacture of very long fiber reinforced parts. Variations on mold design and clamping cycles yield a variety of parts having foamed regions surrounded by more dense un-foamed regions. The method is particularly well adapted to the manufacture of large, very long fiber reinforced, foam-centered, hard surfaced, light weight, rigid parts.

14 Claims, 3 Drawing Sheets

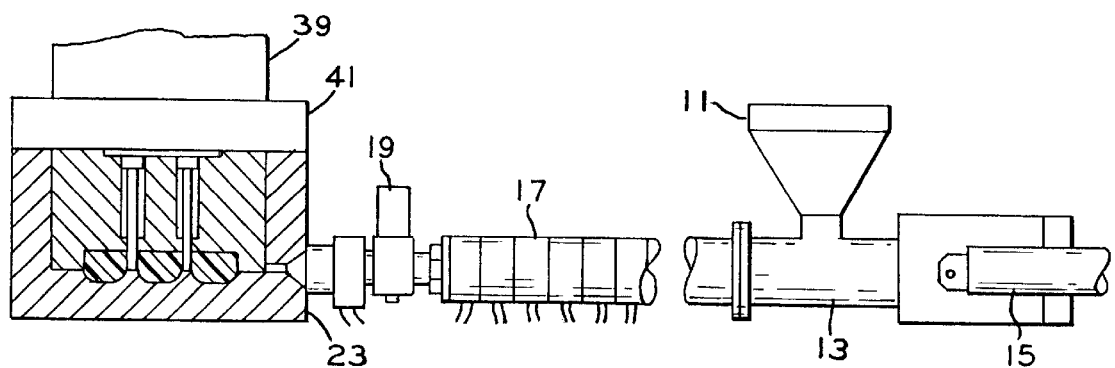
FIG_7
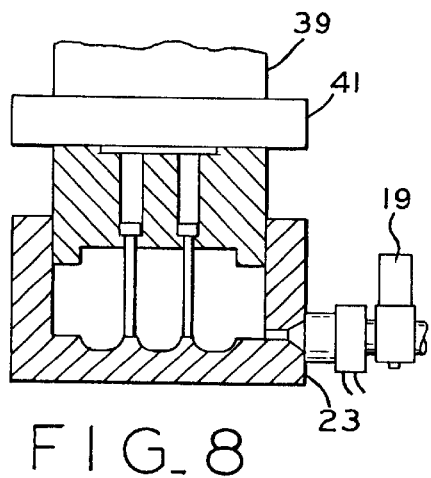
FIG_8
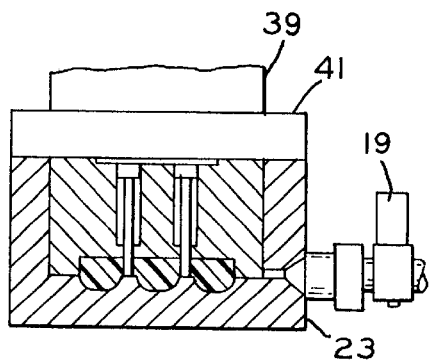
FIG_9
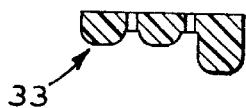
FIG_10
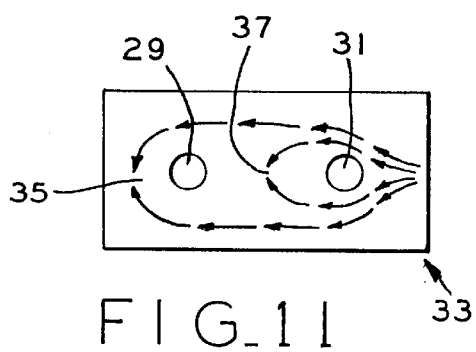
FIG_11

WELD LINE SUPPRESSION

SUMMARY OF THE INVENTION

The present invention relates generally to plastic injection molding techniques and more specifically to such techniques which reduce or eliminate weld lines and their weakness problems.

Weld lines are the "lines" where flow fronts of injected heat softened plastic materials meet in the filling of pre-closed molds. These fronts are cooled by flowing over cool mold surfaces and therefore bond less well and give a weakened inter-flow-front surface bonding.

Since there is no mixing, interlocking, interleaving or knitting of the flow front materials, this weakening effect is particularly apparent when fiber reinforced thermoplastic materials are molded. The reinforcing fibers enhance the part's strength everywhere except at the weld lines where the fibers fail to intermesh.

In U.K. Patent 2,170,142 attempts to avoid weld lines or seams by providing pistons positioned about a die cavity which operate in synchronism to pump the plastic back and forth generally perpendicular to the direction of extrusion so that as a melt passes through the die cavity the pistons operate causing the extrudate to move circumferentially or transversely about the die cavity thereby eliminating seams, voids and other defects. Special heating of the runners would be required for some part configurations. The piston configuration needs to be tailored to a particular part configuration and large gates along with extensive trimming of scrap would be frequently required. For many part configurations, the process appears to be relatively slow.

The present invention may advantageously utilize molding materials such as disclosed in my copending application Ser. No. 08/333,504, entitled FOLDED FIBER FILLED MOLDING MATERIAL, filed on even date herewith, the entire disclosure of which is specifically incorporated herein by reference; however, other materials may be utilized in the practice of the present invention.

Among the several objects of the present invention may be noted the reduction or elimination of weak regions in fiber reinforced injection molded plastic parts; the avoidance of the above noted prior art drawbacks; the provision of a technique for forming foamed plastic parts having selected low density regions; and the provision of a process of operating an injection molding machine to manufacture, in a mold cavity, a substantially weld line free plastic part. These as well as other objects and advantageous features of the present invention will be in part apparent and in part pointed out hereinafter.

In general, after injection molding of a prior part, a compression type mold is partly pre-closed sufficiently to form an enclosing compartment. The enclosing compartment is then explosively filled with a molding material followed by rapid compaction of the material within the enclosing compartment. By "explosively filling" is meant a highly turbulent flow through open gates and runners (if used) under high enough injection pressures to turbulently fill the mold very quickly, e.g., in from a fraction of a second to under five seconds and providing fill and compaction time short enough to permit satisfactory part finish before cooling causes blemishes. Preferably, the compaction immediately follows mold fill.

Also in general, a new molding method for virtually eliminating weld lines and flow orientation in molded plastic parts utilizes an almost explosively rapid turbulent injection fill of a partly closed compression-type mold with a suitable amount of foamed plastic followed by compression molding of the foamed material to the desired density.

Still further in general and in one form of the invention, a foamed plastic part having selected low density regions is made by injection molding the part with a uniform density and subsequently reducing the density in the selected regions. The subsequent reduction may be effected by selectively heating the selected regions or by selectively reducing the pressure to which the part is subjected during, or immediately after, a compression molding step.

BRIEF DESCRIPTION OF THE DRAWINGS

FIG. 7 is a somewhat schematic illustration of an injection molding machine, cavity defining mold, and mold closing press ram similar to FIG. 1, but illustrating the present invention in another form;

FIG. 8 shows a portion of the apparatus of FIG. 7 as material is being injected into the mold cavity;

FIG. 9 shows a portion of the apparatus of FIG. 7 closed to compress the plastic material therein;

FIG. 10 shows a variation on producing a foam-centered, hard-surfaced part similar to FIG. 6;

FIG. 11 is a top view of a part similar to the part of FIGS. 4, 6 and 10 illustrating the plastic flow pattern and creation of weld lines characteristic of the prior art.

Corresponding reference characters indicate corresponding parts throughout the several views of the drawing.

The examples set out herein illustrate a preferred embodiment of the invention in one form thereof and such examples are not to be construed as limiting the scope of the disclosure or the scope of the invention in any manner.

DESCRIPTION OF THE PREFERRED EMBODIMENT

Figure 1:
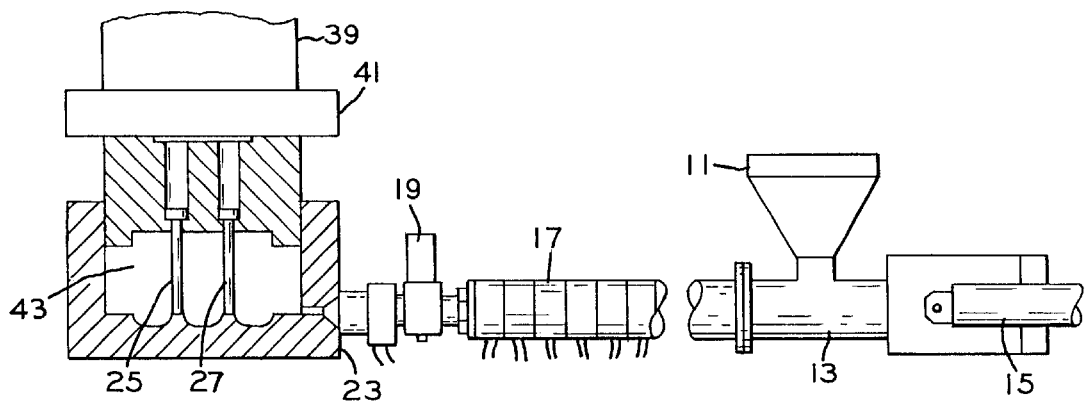
FIG. 1 is a somewhat schematic illustration of an injection molding machine, cavity defining mold, and mold closing press ram illustrating the present invention in one form.
Figure 2:
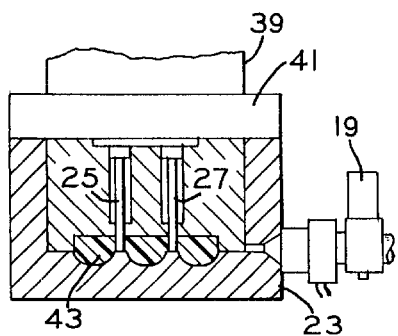
FIG. 2 shows a portion of the apparatus of FIG. 1 closed to compress the plastic material therein.
Figure 3:
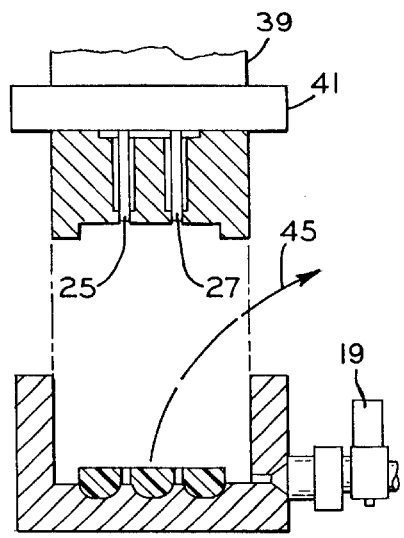
FIG. 3 shows a portion of the apparatus of FIG. 1 opened to eject a completed part after the plastic material has solidified.
Figure 4:
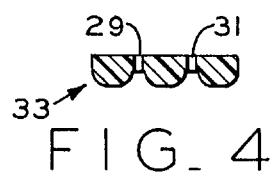
FIG. 4 shows an illustrative part as ejected from the mold cavity of FIG. 3.

Referring now to FIG. 1, foamable thermoplastic pellets are fed to the hopper 11 and from there are supplied to a reciproscrew or similar injection molding machine 13 having a hydraulic forcing cylinder 15 and heated barrel 17. When valve 19 is opened, a measured quantity of pressurized, melt-softened, premixed foam material is introduced into the cavity of a sidegated mold 23. Mold 23 has a pair of cores 25 and 27 for forming a pair of openings 29 and 31 in the illustrative part 33 of FIGS. 4, 10 and 11. With conventional injection molding techniques, the mold 23 would be closed to the position shown in FIG. 2 and then the plastic injected. Under these conditions, the flow of plastic is along the arrowed lines of FIG. 11 and where those lines meet, as at 35 and 37, weld lines are formed. As noted earlier, these lines represent weak regions of the part where breakage is more likely. To eliminate these weld lines, the foamable plastic is injected almost explosively rapidly into the cavity 43 with the mold only partly closed as shown in FIG. 1. After the foamable material is injected and the valve 19 closed, the press ram 39 forces the mold portion 41 downwardly from the position of FIG. 1 to that of FIG. 2 thereby compressing the foamed material within the cavity 43 causing intimate mixing of the material fronts as they meet and virtual elimination of the weld lines 35 and 37. Thus, a measured quantity of foamable plastic material which preferably contains fibrous reinforcement is injected into the cavity 43 and then the volume of the cavity along with the volume of the material therein is reduced by closing the mold from the position of FIG. 1 to that of FIG. 2. The volume of the cavity may be reduced and the foamed material compressed sufficiently to produce an essentially foam-free part, or reduced a lesser controlled amount so as to produce a foam-centered, hard-surfaced part. A volume reduction to, on the order of, at least one-half the initial volume has been found preferable for producing foam-free fiber reinforced parts. A reduction to one-fifth, for example, has been found suitable for many applications. The material is then allowed to solidify. The ram 39 then raises mold portion 41 separating the mold halves so that the part 33 may be ejected as indicated by arrow 45 in FIG. 3.

Figure 6:
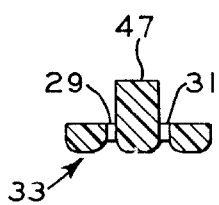
FIG. 6 shows an illustrative part as produced by the modified mold of FIG. 5.
Figure 5:
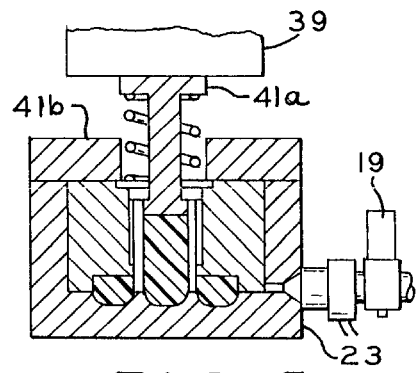
FIG. 5 shows a portion of the apparatus of FIG. 1 which has been modified to produce a foam-centered, hard-surfaced part.

It is possible to take further advantage of the presence of the foamable material to produce a foam-centered, hard-surfaced part by enlarging the volume of the mold cavity relieving the compressive force on the part during (or after partial) solidification. This is accomplished by allowing an initial solidification of the outer surface of the part prior to enlarging the cavity and then allowing the remaining solidification of the part interior subsequent to enlarging the cavity. FIG. 5 illustrates such an enlargement of only a portion of the cavity causing re-foaming of the central region of the part as shown by the enlargement at 47 in FIG. 6. There are two parts 41a and 41b to the top portion 41 of the mold of FIG. 5. These parts are spring biased so that as the ram 39 raises, only the central part 41a moves upward. This enlarges only the central portion of the mold cavity. Further raising of the ram 39 will then raise part 41b opening the mold for part ejection. Thus, FIG. 5 illustrates an intermediate step between those of FIGS. 2 and 3 for producing the slightly modified part of FIG. 6. FIG. 5 shows a mold cavity enclosed by three relatively movable parts. The initial mold cavity volume reduction is effected by moving the two parts 41a and 41b downward relative to the third part while the subsequent enlargement is effected by moving part 41a only relative to the other parts.

Since part 33 cools from the surface inwardly, the central region retains a measure of re-foamability. Hence, a part having a foamed portion may be made by the technique shown in FIG. 10. Here heat shown at 49 is utilized to reheat a portion of the part after it has been allowed to solidify and ejected from the mold.

In FIGS. 7–9, a further variation on the present inventive technique which enhances material mixing at the flow fronts and increases the rate at which material can be injected into the cavity is shown. This modification also eliminates the need for any mold cavity air escape vents. In FIG. 1, the mold parts were initially only partly closed, while in FIG. 7, those parts are completely closed at the beginning of an injection cycle. Thus as the initial step, the volume of the cavity is reduced while the cavity is void of material. In FIGS. 7 and 8, valve 19 is opened and, at the same time, ram 39 is actuated to move upwardly thereby expanding the volume of the cavity while injecting the measured quantity of foamable plastic material. In essence, ram motion tends to suck material into the cavity. Of course, some provision is be made for allowing air to escape from the mold as it is pre-closed after molding a prior part. Rapid mold opening just prior to or in synchronism with valve 19 opening creates a vacuum which sucks in material and assists in mold fill. A preferred method for controlling and measuring, reproducably, the amount of injected material is control of reciproscrew or other ram movement during mold injection fill. When ram is moved full stroke forward each cycle, the reciproscrew travel rearward accurately determines the volume of unfoamed, but foamable melt, if the valve 19 is closed and there is enough "ram forward pressure" to prevent foam formation until valve 19 is opened. In one preferred form, the time rate of change of cavity volume is substantially the same as the rate at which material is being injected so that the cavity expands in synchronism with the injection of the material. When the cavity if filled to the preferred volume, the valve 19 is closed and the ram 38 lowered to compress the cavity to the volume shown in FIG. 9. FIG. 9 corresponds to FIG. 2 from which processing continues as discussed earlier.

Figure 12:
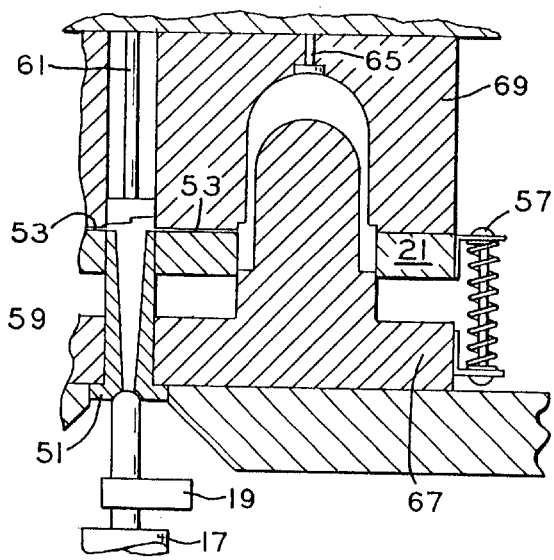
FIGS. 12–14 illustrate the sequential positions of the mold halves in practicing the present invention with a two cavity center-gated mold for producing illustrative foam cups.
Figure 13:
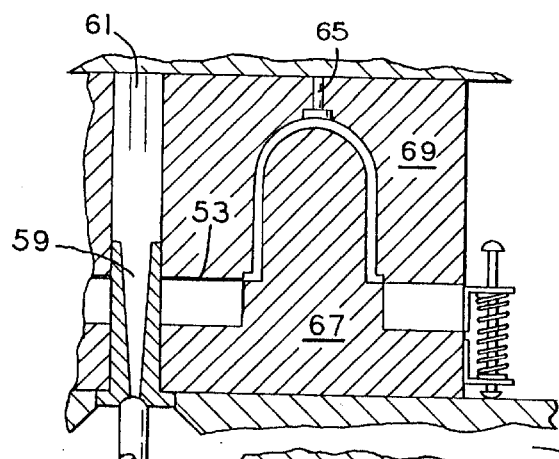
Figure 14:
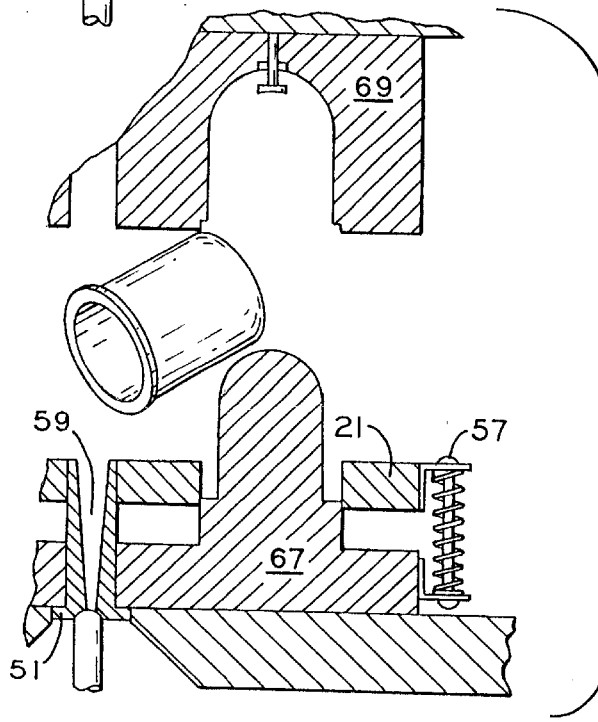

FIGS. 12–14 show a three plate mold where the middle runner plate 21 provides the cavity expansion as depicted in FIG. 12. These figures illustrate an adaptation of somewhat conventional center gating to form "flashless" parts such as the illustrated foamed cups. Conventional compression molding techniques have pinch zones which result in flash on the parts. In FIG. 12, a measured quantity of foamable plastic material is injected into the cavity by way of the sprue bushing 51, and runners 53. As the upper press platen moves downwardly, the runner 53 is cut from the sprue 59 and the volume of the cavity along with the volume of the material therein is reduced until the cavity and part are, in cross-section, as shown in FIG. 13. The press platens are then separated and the knock-outs 61, 63 and 65 are actuated to eject the cups and sprue 59. Upward travel of the compression compartment plate 21 is limited by the rods 55 and 57.

As an alternative, subsequent to the ejection of completed cups, the mold halves 67 and 69 may be closed to the position of FIG. 13 and then opened in synchronism with, and to aid in, the injection of plastic into the cavity much the same as discussed in connection with FIGS. 7–9. The sequence of events would then be FIG. 13 with the cavity empty, FIG. 12 filling the cavity, FIG. 13 compressing the material, and FIG. 14 ejecting the completed parts.

The method of operation of the invention should now be clear. A part is formed by first injecting a predetermined volume of foamable plastic material into a part forming mold and then compressing the material thereby reducing the volume of plastic in the mold. The compressing is maintained until at least a portion of the material has solidified. Preferably, the part is fiber reinforced and the fibers are at least ⅜ inch in length.

In summary, the invention has a number of advantages over known prior art and provides material intermixing and compaction interleaving of most weld lines and flow orientation thereby preventing or greatly diminishing weakening in those areas.

From the foregoing, it is now apparent that a novel arrangement has been disclosed meeting the objects and advantageous features set out hereinbefore as well as others. While the invention finds particular utility with long (3/8" to 1/2") and very long (1/2" to, e.g., 2 1/2") fiber reinforced foamable thermoplastic materials used in molding large parts, weld line improvement is not restricted to either fiber reinforced materials or to thermoplastic materials. Thus, numerous modifications as to the precise materials, shapes, configurations and details may be made by those having ordinary skill in the art without departing from the spirit of the invention or the scope thereof as set out by the claims which follow.

What is claimed is:

1. A process of operating an injection molding machine to manufacture, in a mold cavity, a substantially weld line free plastic part comprising the steps of:
   injecting a measured quantity of foamable plastic material from the machine into the cavity;
   reducing the volume of the cavity along with the volume of the material therein sufficiently to produce an essentially foam-free part; and
   allowing the material to solidify.

2. The process of claim 1 wherein the step of reducing the volume comprises a volume reduction to, on the order of, at least one-half the initial volume.

3. The process of claim 2 wherein the foamable plastic material contains fibrous reinforcement.

4. The process of claim 1 including the step of reheating a portion of the part following the step of allowing the material to solidify to re-foam the plastic and thereby produce a part having a foamed portion.

5. The process of claim 4 wherein the foamable plastic material contains fibrous reinforcement.

6. The process of claim 1 further including the steps of reducing the volume of the cavity while the cavity is void of material and thereafter expanding the volume of the cavity while injecting the measured quantity of foamable plastic material.

7. The process of claim 6 wherein the time rate of change of cavity volume is substantially the same as the rate at which material is being injected whereby the cavity expands in synchronism with the injection of the material to thereby enhance material mixing at the flow fronts and increase the rate at which material can be injected into the cavity while eliminating the need for any mold cavity air escape vents.

8. A process of operating a molding machine to manufacture, in a mold cavity, a substantially weld line free plastic part comprising the steps of:
   pre-closing the mold cavity after molding a prior part to form an enclosing compartment;
   explosively filling the enclosing compartment with a molding material; and
   rapidly compacting the material within the enclosing compartment.

9. The process of claim 9 wherein the step of rapidly compacting immediately follows completion of the explosively filling step.

10. The process of claim 9 wherein the molding material is a foamed plastic material containing fibrous reinforcement.

11. A process of operating an injection molding machine to manufacture, in a mold cavity, a substantially weld line free plastic part comprising the steps of:
   injecting a measured quantity of foamable plastic material from the machine into the cavity;
   reducing the volume of the cavity along with the volume of the material therein a controlled amount so as to produce a foam-centered, hard-surfaced part; and
   allowing the material to solidify.

12. The process of claim 11 further including the step of enlarging the volume of the cavity, the step of allowing the material to solidify including allowing an initial solidification of the outer surface of the part prior to the step of enlarging followed by solidification of the part interior subsequent to the step of enlarging to thereby produce a foam-centered, hard-surfaced part.

13. The process of claim 12 wherein the mold cavity is enclosed by three relatively movable rigid parts, the step of reducing being performed by moving two of the parts relative to the third part, and the step of enlarging being performed by moving one of said two parts relative to the other of said two parts and the third part.

14. The process of claim 11 wherein the foamable plastic material contains fibrous reinforcement.

\* \* \* \* \*